(12) United States Patent
Weatherhead

(10) Patent No.: US 10,895,859 B2
(45) Date of Patent: Jan. 19, 2021

(54) DATA DISCOVERY AND INTEGRATION BETWEEN DISPARATE CONTROL AND INFORMATION SYSTEMS

(71) Applicant: Sensia LLC, Houston, TX (US)

(72) Inventor: Norman Andrew Weatherhead, Kitchener (CA)

(73) Assignee: Sensia LLC, Houston, TX (US)

( * ) Notice: Subject to any disclaimer, the term of this patent is extended or adjusted under 35 U.S.C. 154(b) by 474 days.

(21) Appl. No.: 15/812,941

(22) Filed: Nov. 14, 2017

(65) Prior Publication Data

US 2019/0146443 A1 May 16, 2019

(51) Int. Cl.
*G05B 19/042* (2006.01)
*G06Q 10/06* (2012.01)
(Continued)

(52) U.S. Cl.
CPC ......... *G05B 19/0426* (2013.01); *G06Q 10/06* (2013.01); *G06Q 10/08* (2013.01);
(Continued)

(58) Field of Classification Search
CPC ...... G05B 19/0426; G05B 2219/25293; G06Q 10/06; G06Q 10/08; G06Q 10/087; G06Q 10/0875; G06Q 50/04; H04Q 2209/00; H04Q 2209/10; H04Q 2209/40; H04Q 9/00
See application file for complete search history.

(56) References Cited

U.S. PATENT DOCUMENTS 8,620,552 B2 * 12/2013 DeSanzo .................. G08G 9/00
701/70
9,528,861 B1 * 12/2016 Haupt ...................... G01D 7/00
(Continued)

FOREIGN PATENT DOCUMENTS

EP 2801938 A1 11/2014

OTHER PUBLICATIONS

Extended EP Search Report for EP Application No. 18175688.3 dated Aug. 22, 2018; 9 Pages.
(Continued)

*Primary Examiner* — Franklin D Balseca
(74) *Attorney, Agent, or Firm* — Foley & Lardner LLP

(57) ABSTRACT

A system includes a database, a computing system that controls operations of industrial equipment, a skid computing system that is directly coupled to the industrial equipment and controls the operations of the industrial equipment, and an interface gateway system communicates with the computing system and the skid computing system. The interface gateway system retrieves identification data associated with the industrial equipment from the skid computing system, generates a signature associated with the industrial equipment based on the identification data, generates an interface that interprets data related to the industrial equipment based on the signature, stores the interface and an association with a respective signature in the database, and transmits the data and the interface to the computing system. The interface enables the computing system to display the data via a display of the computing system and adjust the operations of the industrial equipment via the skid computing system.

20 Claims, 7 Drawing Sheets

(51) Int. Cl.
  *G06Q 10/08* (2012.01)
  *G06Q 50/04* (2012.01)
(52) U.S. Cl.
  CPC ....... *G06Q 10/087* (2013.01); *G06Q 10/0875* (2013.01); *G06Q 50/04* (2013.01); *G05B 2219/25293* (2013.01)

(56) References Cited

U.S. PATENT DOCUMENTS

| | | |
|---|---|---|
| 10,484,512 B2* | 11/2019 | Pai .......................... H04L 69/18 |
| 2017/0138180 A1 | 5/2017 | Weatherhead et al. |
| 2019/0324010 A1* | 10/2019 | Allouche ................ E21B 49/08 |

OTHER PUBLICATIONS

EP Examination Report for European Application No. EP 18175688.3 dated Jul. 16, 2020, 9 pages.

* cited by examiner

DATA DISCOVERY AND INTEGRATION BETWEEN DISPARATE CONTROL AND INFORMATION SYSTEMS

BACKGROUND

The present disclosure relates generally to improved monitoring of operations at a hydrocarbon well site. More specifically, the present disclosure relates to acquiring data from various components and systems at a hydrocarbon well site.

As hydrocarbons are extracted from hydrocarbon reservoirs via hydrocarbon wells in oil and/or gas fields, the extracted hydrocarbons may be transported to various processing stations via a network of pipelines. For example, the hydrocarbons may be extracted from the reservoirs via the hydrocarbon wells and may then be transported, via the network of pipelines, from the wells to various processing stations. The various processing stations may include various types of assets (e.g., devices, equipment, tanks, and the like) that may perform different functions at various phases of hydrocarbon processing to make the produced hydrocarbons available for use or transport. Examples of these assets may include assets used in filtration systems, mining systems, chillers, packaged boilers, steam systems, water/waste water treatment systems, reactors, etc.

Information related to the extracted hydrocarbons or related to the assets at various processing stations may be gathered and may be used to ensure that the well site or pipelines are operating safely and that the extracted hydrocarbons have desired qualities. Up-to-date operation management of the assets at the various processing stations may also help improving production of the hydrocarbon well site. However, as these assets (e.g., devices, machine, equipment, and the like) may be manufactured, marketed, or re-sold by different entities or companies, different software (e.g., protocols, software platform) may be used for data communication, control, and/or management of these assets depending on their associated entities. As such, it may be challenging, time-consuming, cumbersome, and/or expensive to integrate a number of different assets associated with different entities.

BRIEF DESCRIPTION

In one embodiment, a system includes a database and a computing system that controls one or more operations of industrial equipment disposed on a skid. The system includes a skid computing system that is directly coupled to the industrial equipment and controls the one or more operations of the industrial equipment. The system also includes an interface gateway system communicates with the computing system and the skid computing system. The interface gateway system retrieves identification data associated with the industrial equipment from the skid computing system, generates a signature associated with the industrial equipment based on the identification data, and generates an interface that interprets data related to the industrial equipment based on the signature. The interface gateway system also stores the interface and an association with a respective signature in the database, and transmits the data and the interface to the computing system. The interface enables the computing system to display the data via a display of the computing system and adjust one or more operations of the industrial equipment via the skid computing system.

In another embodiment, a method includes retrieving, via a processor, identification data associated with industrial equipment from a first computing system directly coupled to the industrial equipment. The method includes generating, via the processor, a signature associated with the industrial equipment based on the identification data. The method includes retrieving, via the processor, an interface that interprets data related to the industrial equipment from a database based on the signature, wherein the database comprises a plurality of interfaces. The method also includes transmitting, via the processor, the data and the interface to a second computing system. The interface enables the second computing system to generate one or more visualizations comprising the data and adjust one or more operations of the industrial equipment via the first computing system.

In yet another embodiment, a non-transitory computer readable medium comprising computer-executable code when executed causes a processor to retrieve identification data associated with industrial equipment from a first computing system directly coupled to the industrial equipment, to generate a signature associated with the industrial equipment based on the identification data, to generate an interface that interprets data related to the industrial equipment based on the signature, to store the interface and an association with a respective signature in a database, and to transmit the data and the interface to a second computing system. The interface enables the second computing system to display the data via a display of the second computing system and adjust one or more operations of the industrial equipment via the first computing system.

DRAWINGS

These and other features, aspects, and advantages of the present embodiments disclosed herein will become better understood when the following detailed description is read with reference to the accompanying drawings in which like characters represent like parts throughout the drawings, wherein.

DETAILED DESCRIPTION

Figure 1:
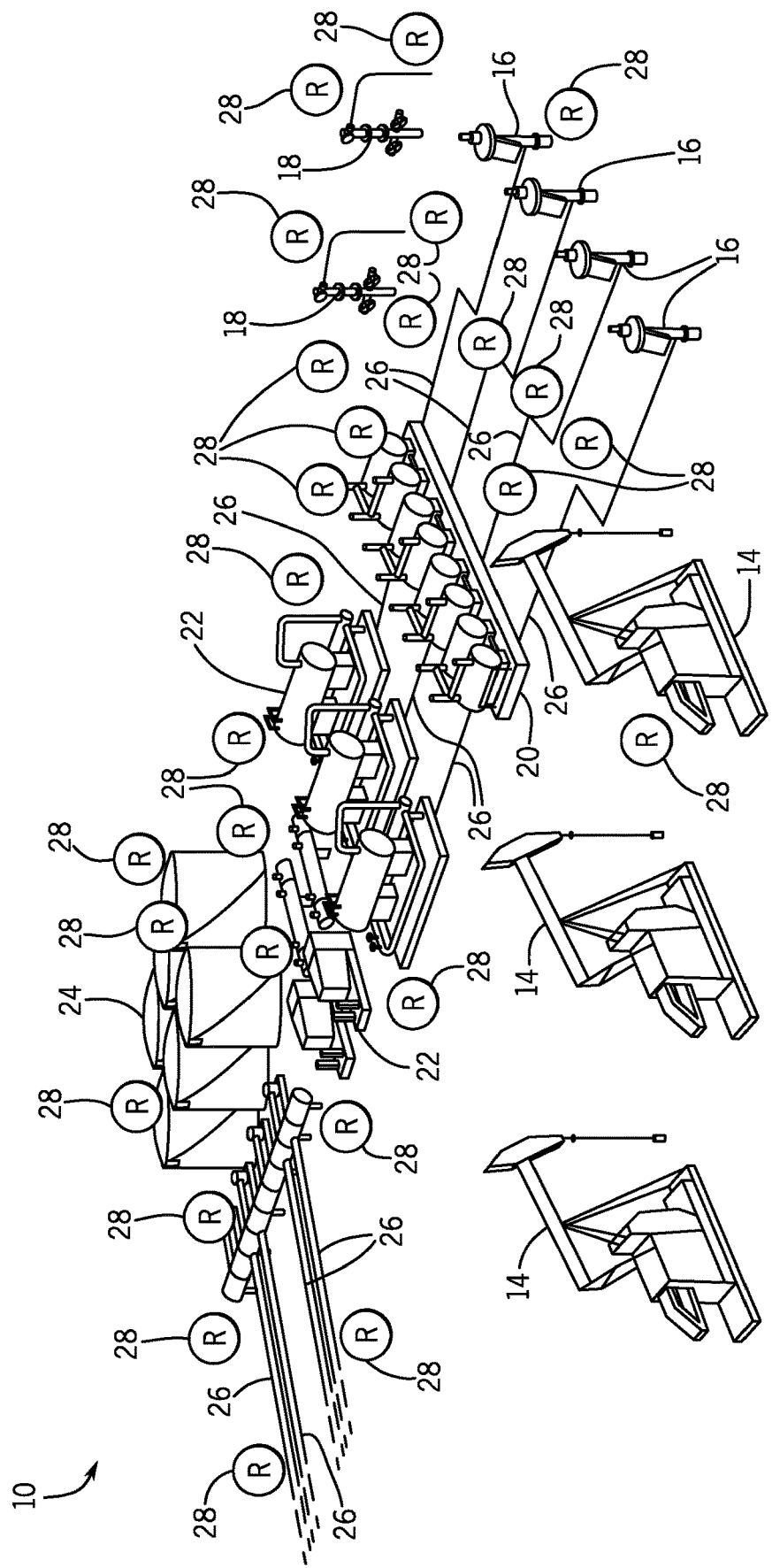
FIG. 1 illustrates a schematic diagram of an example hydrocarbon well site that may produce and process hydrocarbons, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for configuring, monitoring, maintaining, and managing an industrial site, such as a hydrocarbon well site. Moreover, embodiments of the present disclosure are related improved systems and methods for integrating various equipment at an industrial site via a common control platform.

Generally, an industrial site or plant, such as a hydrocarbon well site may include assets that perform different functions. For example, these assets may include original equipment manufacturer (OEM) pieces of equipment of different OEM equipment skids (e.g., each skid is a collection of OEM equipment) or "skids" for short. It is desirable to perform plant operations with increased visibility, control, and management to operations and information of various OEM equipment or skids. However, since these assets (e.g., OEM equipment and/or skids) may be from different manufacturers, marketed, or re-sold by different companies, it may be challenging, time-consuming, cumbersome, and/or expensive to achieve system level integration of these assets. Accordingly, it is now recognized that improved systems and methods for configuring, monitoring, maintaining, and managing various assets (e.g., OEM equipment and/or skids) via a common software platform are desirable.

In certain embodiments, an interface gateway system may build an interface (e.g., visualization, control interface, display interface) for each piece of OEM equipment and/or each skid, such that a common computing system may integrate with or establish communication capabilities and data monitoring operations with assets regardless of their origins (e.g., original manufacturer, marketing company, re-seller), types, and functionalities. For example, the interface gateway system may build an interface that details how data is organized or structured in an asset based on a signature of the OEM equipment or skid (e.g., unique identification, characteristics, functionalities, properties). This interface may in turn be used by a computing system (e.g., a control, processing, and/or monitoring system) or platform to communicate and/or integrate with the various pieces of OEM equipment or skids. That is, the interfaces generated by the interface gateway system may enable the computing system or platform to operate as a central platform (e.g., software) that accesses data regarding various pieces of OEM equipment or skids, although the various pieces of OEM equipment or skids may have different origins, types, and functionalities. In addition, the interface may enable the central platform to present the data in a format native to the central platform, along with other data that the central platform regularly monitors. Furthermore, after interfaces are generated, the interface gateway system may store the interfaces in a database. As such, the interface gateway system may reuse the previously built interfaces saved in the database after determining that the same piece or the same type of OEM equipment or skid is coupled to the interface gateway system. In this way, the interface gateway system may avoid performing redundant operations in building multiple interfaces for the same equipment and may more efficiently integrate a number of different assets (e.g., OEM equipment and/or skids).

By way of introduction, FIG. 1 illustrates a schematic diagram of an example hydrocarbon site 10 or hydrocarbon well site that may employ an integration gateway system to integrate various pieces of equipment (e.g., OEM equipment) and/or skids performing different functions at the hydrocarbon well site 10. In the illustrated embodiment, the hydrocarbon site 10 may be an area in which hydrocarbons, such as crude oil and natural gas, may be extracted from the ground, processed, and stored. As such, the hydrocarbon site 10 may include a number of wells and a number of well devices or equipment that may control the flow of hydrocarbons being extracted from the wells. In one embodiment, the well devices at the hydrocarbon site 10 may include any device equipped to monitor and/or control production of hydrocarbons at a well site. As such, the well devices may include pumpjacks 14, submersible pumps 16, well trees 18, and the like. After the hydrocarbons are extracted from the surface via the well devices, the extracted hydrocarbons may be distributed to other devices such as wellhead distribution manifolds 20, separators 22, storage tanks 24, and the like. At the hydrocarbon site 10, the pumpjacks 14, submersible pumps 16, well trees 18, wellhead distribution manifolds 20, separators 22, and storage tanks 24 may be connected together via a network of pipelines 26. As such, hydrocarbons extracted from a reservoir may be transported to various locations at the hydrocarbon site 10 via the network of pipelines 26.

The pumpjack 14 may mechanically lift hydrocarbons (e.g., oil) out of a well when a bottom hole pressure of the well is not sufficient to extract the hydrocarbons to the surface. The submersible pump 16 may be an assembly that may be submerged in a hydrocarbon liquid that may be pumped. As such, the submersible pump 16 may include a hermetically sealed motor, such that liquids may not penetrate the seal into the motor. Further, the hermetically sealed motor may push hydrocarbons from underground areas or the reservoir to the surface.

The well trees 18 or Christmas trees may be an assembly of valves, spools, and fittings used for natural flowing wells. As such, the well trees 18 may be used for an oil well, gas well, water injection well, water disposal well, gas injection well, condensate well, and the like. The wellhead distribution manifolds 20 may collect the hydrocarbons that may have been extracted by the pumpjacks 14, the submersible pumps 16, and the well trees 18, such that the collected hydrocarbons may be routed to various hydrocarbon processing or storage areas at the hydrocarbon site 10.

The separator 22 may include a pressure vessel that may separate well fluids produced from oil and gas wells into separate gas and liquid components. For example, the separator 22 may separate hydrocarbons extracted by the pumpjacks 14, the submersible pumps 16, or the well trees 18 into oil components, gas components, and water components. After the hydrocarbons have been separated, each separated component may be stored in a particular storage tank 24. The hydrocarbons stored in the storage tanks 24 may be transported via the pipelines 26 to transport vehicles, refineries, and the like.

The well devices may also include monitoring systems that may be placed at various locations at the hydrocarbon site 10 to monitor or provide information related to certain aspects of the hydrocarbon site 10. The monitoring system may be a controller, a remote terminal unit (RTU) 28, or any computing device that may include communication abilities, processing abilities, and the like. As set forth above, for discussion purposes, the monitoring system is embodied as the RTU 28 throughout the present disclosure. However, it should be understood that the RTU 28 may be any suitable component capable of monitoring and/or controlling various components at the hydrocarbon site 10.

The RTU 28 may include sensors or may be coupled to various sensors that may monitor various properties associated with a component at the hydrocarbon site 10. The RTU 28 may then analyze the various properties associated with the component and may control various operational parameters of the component. For example, the RTU 28 may measure a pressure or a differential pressure of a well or a component (e.g., storage tank 24) at the hydrocarbon site 10. The RTU 28 may also measure a temperature of contents stored inside a component at the hydrocarbon site 10, an amount of hydrocarbons being processed or extracted by components at the hydrocarbon site 10, and the like. The RTU 28 may also measure a level or amount of hydrocarbons stored in a component, such as the storage tank 24. In certain embodiments, the RTU 28 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by Rockwell Automation of Houston, Tex.

In one embodiment, the RTU 28 may include a sensor that may measure pressure, temperature, fill level, flow rates, and the like. The RTU 28 may also include a transmitter, such as a radio wave transmitter, that may transmit data acquired by the sensor via an antenna or the like. The sensor in the RTU 28 may be wireless sensors that may be capable of receive and sending data signals between RTUs 28. To power the sensors and the transmitters, the RTU 28 may include a battery or may be coupled to a continuous power supply. Since the RTU 28 may be installed in harsh outdoor and/or explosion-hazardous environments, the RTU 28 may be enclosed in an explosion-proof container that may meet certain standards established by the National Electrical Manufacturer Association (NEMA) and the like, such as a NEMA 4X container, a NEMA 7X container, and the like.

The RTU 28 may transmit data acquired by the sensor or data processed by a processor to other monitoring systems, a router device, a supervisory control and data acquisition (SCADA) device, or the like. As such, the RTU 28 may enable users to monitor various properties of various components at the hydrocarbon site 10 without being physically located near the corresponding components.

In operation, the RTU 28 may receive real-time or near real-time data associated with a well device. The data may include, for example, tubing head pressure, tubing head temperature, case head pressure, flowline pressure, wellhead pressure, wellhead temperature, and the like. In any case, the RTU 28 may analyze the real-time data with respect to static data that may be stored in a memory of the RTU 28. The static data may include a well depth, a tubing length, a tubing size, a choke size, a reservoir pressure, a bottom hole temperature, well test data, fluid properties of the hydrocarbons being extracted, and the like. The RTU 28 may also analyze the real-time data with respect to other data acquired by various types of instruments (e.g., water cut meter, multiphase meter) to determine an inflow performance relationship (IPR) curve, a desired operating point for a wellhead, key performance indicators (KPIs) associated with the wellhead, wellhead performance summary reports, and the like.

Figure 2:
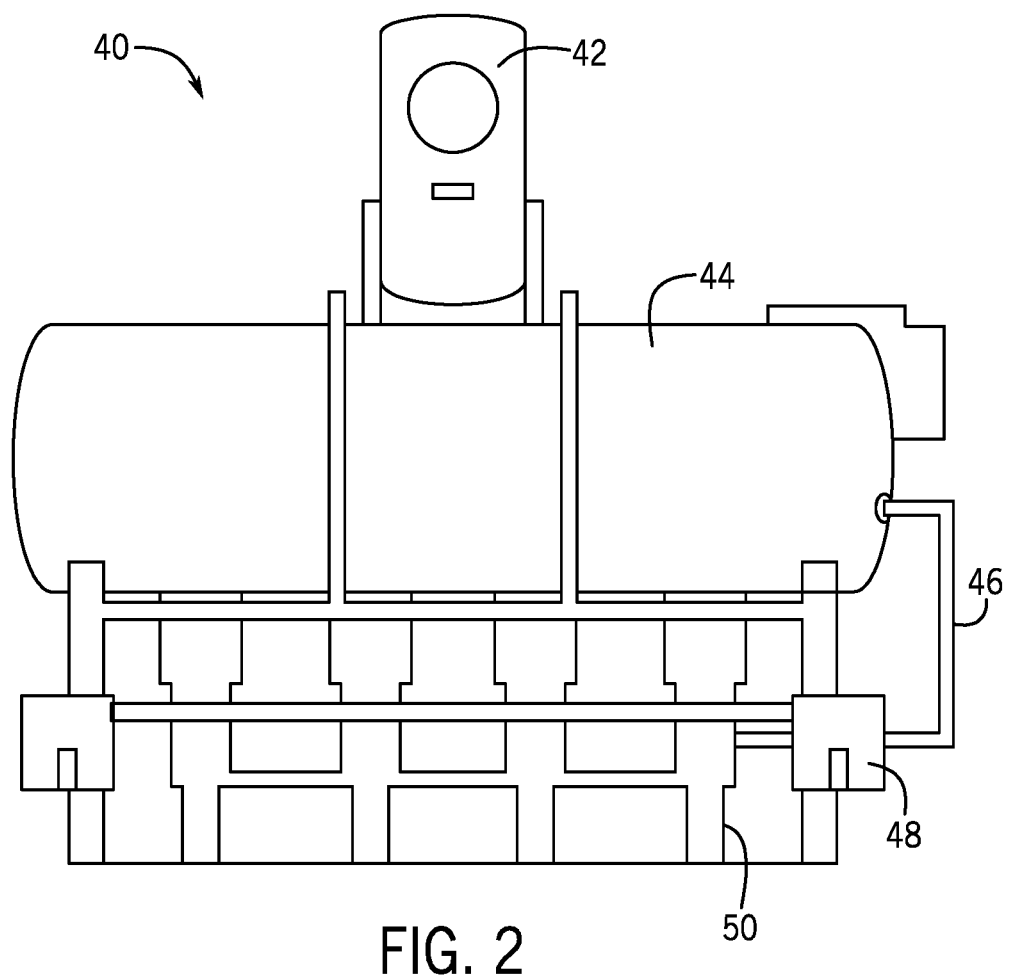
FIG. 2 illustrates a schematic of an example original equipment manufacturer (OEM) skid at the hydrocarbon well site of FIG. 1, in accordance with embodiments presented herein.

As may be appreciated, any piece of the assets at the hydrocarbon site 10 may be a piece of OEM equipment, and an OEM skid or "skid" for short is referenced as a collection of OEM equipment. By way of example, skid may include, but are not limited to, a filtration skid, a chiller skid, a mining skid, a steam system skid, a packaged boiler skid, an oil & gas skid, a water/waste water skid, and a bio reactor skid. In yet another example, FIG. 2 illustrates a schematic of an example skid 40 or OEM skid that may be used at the hydrocarbon site 10 of FIG. 1. The skid 40 may correspond to a well test separator skid that may be transported to different hydrocarbon sites 10 to perform well test operations. As shown in FIG. 2, the skid 40 may include various parts or components, such as gas tank 42, a tank 44, piping 46, skid computing system 48, oil or gas outlets 50, and the like. The collection of these components on the skid 40 enable the skid 40 to perform a desired function. In certain embodiments, different types of skids that perform different types of operations may be disposed across the hydrocarbon site 10. In some cases, different skids may be manufactured by different entities and thus may be controlled and/or operated using different software platforms (e.g., skid computing system 48). For an operator of the hydrocarbon site 10, the different software platforms to control and monitor the operations of various skids and equipment disposed throughout the hydrocarbon site 10 may prove to be a challenge.

Figure 3:
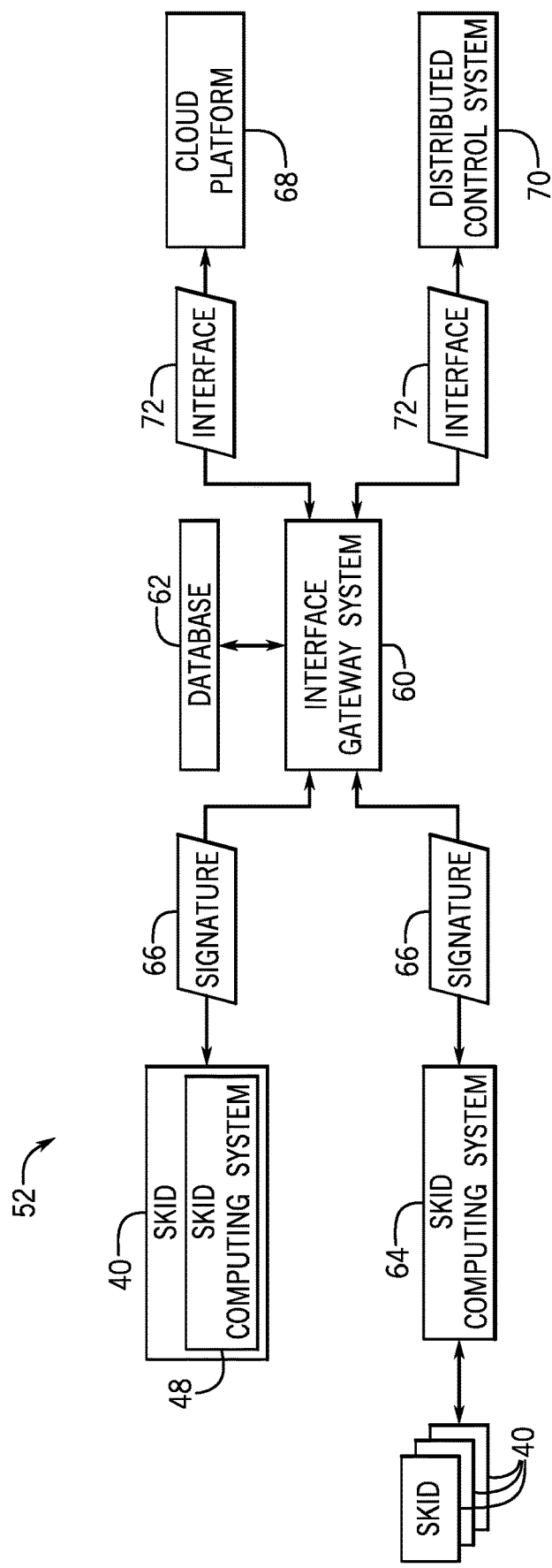
FIG. 3 illustrates an overview of an integration architecture for OEM skid integration, in accordance with embodiments presented herein.

With the foregoing in mind, in some embodiments, an interface gateway system that may communicatively couple to different types of equipment (e.g., skid computing system 48) and provide interface data to another computing system that enables a user to control and/or monitor the different types of equipment in the native format of the other computing system. For instance, FIG. 3 illustrates an overview of an integration architecture 52 that depicts how an interface gateway system 60 may interact with different equipment (e.g., skids) and provide interfaces for various control systems. In the illustrated embodiment, the integration architecture 52 include the interface gateway system 60 communicatively coupled (e.g., via wired and/or wireless communication) to multiple skids 40, one or more databases 62 (e.g., an on-site or a remote database storage structure), one or more cloud platforms 68 (e.g., a suite of cloud computing services), and one or more distributed control systems 70 (e.g., a computerized control system for a process or plant with a large number of equipment, devices, control loops). As mentioned above, the skid 40 may include a skid computing system 48. In some embodiments, the skid computing system 48 may be directly coupled to the skid 40 (e.g., coupled via wired communication, the skid computing system 48 is physically integrated with or disposed on or within the skid 40). In some embodiments, the skid computing system 48 may be indirectly coupled to the skid 40 (e.g., coupled via wireless communication, not in direct physical contact with the skid 40). The skid computing system 48 may perform various functions of the skid 40 and communicatively couple the skid 40 to other computing systems, such as the interface gateway system 60 and the like. In one embodiment, the skid computing system 48 may directly (e.g., without intermediary components) receive data from different equipment disposed on the respective skid 40. In addition, the skid computing system 48 may be communicatively coupled to actuators, motors, valves, and other control components to adjust the operations of various equipment disposed on the skid 40.

In addition to controlling and/or monitoring one skid, in some embodiments, the integration architecture 52 may include a skid computing system 64. The skid computing system 64 may function in the same manner as the skid computing system 48, but for multiple skids 40. In either case, the skid computing system 48 or 64 may include a communication component, a processor, a memory, among other components. The communication component may be a wireless or wired communication component and/or I/O ports. The communication component may facilitate communication and/or interfacing between various OEM equipment of the skid 40, the interface gateway system 60, various control systems, and the like. The processor may be any type of computer processor or microprocessor capable of executing computer-executable code. The memory may be any suitable articles of manufacture that can serve as media to store processor-executable code, data, or the like. These articles of manufacture may represent computer-readable media (i.e., any suitable form of memory or storage) that may store the processor-executable code used by the processor to perform various functions of the skid 40). The memory may be used to store data related to operations of the skid 40, data collected by the skid 40, data received via the I/O ports, data analyzed by the processor, and so forth.

The memory may also be used to store identification data of the various pieces of OEM equipment and/or identification data of the skid 40. Examples of the identification data may include an indication of an identity of the OEM equipment, a location (e.g., global positioning system (GPS) coordinate) of the OEM equipment, a vendor or manufacturer associated with the OEM equipment, a model number associated with the OEM equipment, a serial number associated with the OEM equipment, a firmware version associated with the OEM equipment, a context of functionalities or characteristics of the OEM equipment, and the like. Examples of the context of functionalities or characteristics of the OEM may include information or data indicative of what the OEM equipment is used for (e.g., a type of monitoring device, a type of machinery, a type of operation), a range of expected values (e.g., a maximum and a minimum) of certain operational parameters (e.g., temperatures, pressures, forces, concentrations, and so forth) of the OEM equipment, relationship to other OEM equipment (e.g., connectivity or association with other OEM equipment), specifications of the OEM equipment (e.g., tubing length, tubing size, choke size, and the like). In some embodiments, based on the context of functionalities or characteristics, the OEM equipment or the skid 40 may be identified as used for certain applications, such as applications in filtration systems, mining systems, chillers, packaged boilers, steam systems, water/waste water treatment systems, reactors, etc. In addition, the identification data may also indicate the type of data collected by the skid 40, the operations that the skid 40 may perform, and the like.

In some embodiments, the identification data may be used by the interface gateway system 60 to generate a signature 66 for the skid 40. It should be noted that the signature 66 is generated to distinguish the respective OEM equipment or the skid 40 from other OEM equipment or skids 40. The signature 66 may include one or more pieces of information that correspond to different pieces of equipment of the skid 40 based on the identification data. That is, the signature 66 may uses one or more pieces of information provided by the identification data to uniquely identify the manufacturer, make, model, and other relevant information regarding the skid computing system 48, the equipment on the skid 40, and the like.

In some embodiments, the signature 66 of the skid 40 may include a collection of signatures of the various pieces of OEM equipment included therein. In some embodiments, the signature 66 of the skid 40 may include one signature that represents a collection of data associated with the entire skid 40. In some embodiments, the signature 66 of the skid may be assigned by a user.

Referring back to the integration architecture 52, the interface gateway system 60 may enable interfacing or integration of the various skids 40 with the one or more cloud platforms 68, the one or more distributed control systems 70, or the like. In particular, the interface gateway system 60 may retrieve the identification data from the skid computing systems 48 and/or 64 of the skids 40, and generate the signature 66 for the skid 40 based on the identification data. The interface gateway system 60 may then build an interface 72 for the corresponding skid 40 based on the signature 66. As used herein, the interface 72 may include a mapping or detailed list of information that indicates locations in which different types of data (e.g., temperature, voltage, current, status) are stored in a respective skid computing system 48, programming details with regard to commands that may be performed by the respective skid computing system 48, expected range of input and output values for different data input and output ports of the respective skid computing system 48, and the like. The interface 72 may provide translation or mapping information that enables another computing system to accurately read and/or interpret data stored on the respective skid computing system 48 and interact (e.g., control, send commands) with the respective skid computing system 48. For instance, the interface 72 may map the data and/or control operations available on the skid computing system 48, such that the same data and/or control operations are displayed and integrated in another software platform for a different computing system (e.g., cloud platforms 68, distributed control systems 70).

In some embodiments, the interface gateway system 60 may take user inputs into account when building the interface 72. As such, the user inputs may specify details with regard to where data is stored in the respective skid computing system 48, format of control commands for the skid computing system 48, and the like. Subsequently, the interface gateway system 60 may save the interface 72 in memory of the interface gateway system 60 and/or in the database 62, and may transmit the interface 72 to the one or more cloud platforms 68 and the one or more distributed control systems 70. The interface 72 may enable the one or more cloud platforms 68 and the one or more distributed control systems 70 to observe various properties of the equipment disposed on the skids 40, integrate or communicate with the skids 40 on the same control platform (e.g., the control system used by the respective cloud platform 68 or the distributed control system 70). In some embodiments, the interface 72 may be a visualization platform (e.g., visualization interface) that may enable users and/or a computing system (e.g., the cloud platform 68 and distributed control system 70) to visualize data associated with the skids 40. In some embodiments, the interface 72 may enable users and/or a computing system (e.g., the cloud platform 68 and distributed control system 70) to provide inputs and/or adjust operations of the skids 40. It should be noted that the computing system (e.g., the cloud platform 68 and the distributed control system 70) and the skids 40 may be from different entities.

Figure 4:
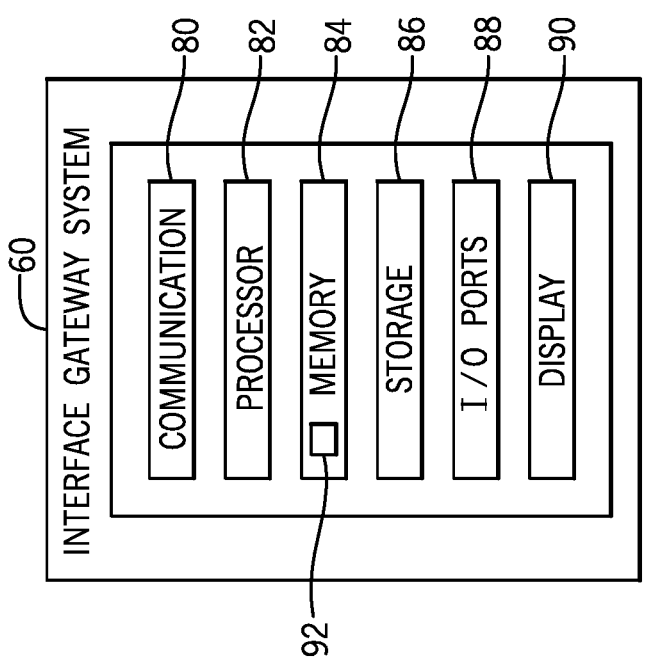
FIG. 4 illustrates a block diagram of an interface gateway system that may be employed in the integration architecture of FIG. 3, in accordance with embodiments presented herein.

FIG. 4 illustrates a block diagram of the interface gateway system 60 that may be employed in the integration architecture 52 of FIG. 3. In the illustrated embodiment, the interface gateway system 60 may include a communication component 80, a processor 82, a memory 84, a storage 86, input/output (I/O) ports 88, a display 90, among other components. The communication component 80 may be a wireless or wired communication component that may facilitate communication with the skid computing systems 48 and/or 64 of the skids 40, the database 62, the one or more cloud platforms 68, and the one or more distributed control system 70. The processor 82 may be any type of computer processor or microprocessor capable of executing computer-executable code. The memory 84 and the storage 86 may be any suitable articles of manufacture that can serve as media to store processor-executable code, data, or the like. These articles of manufacture may represent computer-readable media (i.e., any suitable form of memory or storage) that may store the processor-executable code used by the processor 82 to perform the presently disclosed techniques.

The memory 84 or the storage 86 may be used to store information or data retrieved from the skid computing systems 48 and/or 64 of the skids 40, such as the identification data. The memory 84 or the storage 86 may be used to store the signatures 66 and the interfaces 72 generated by the interface gateway system 60. The memory 84 and the storage 86 may be used to store data received via the I/O ports 88, data analyzed by the processor 82, and so forth. The memory 84 and/or the storage 86 may also store various protocols that may enable the interface gateway system 60 to communicate with the one or more cloud platforms 68 and the one or more distributed control systems 70. Furthermore, the memory 84 and/or the storage 88 may store an application 92 (e.g., an interface builder application) a module, a firmware, or the like that when executed by the processor 82 may generate the signatures 66 and/or build the interfaces 72 for the corresponding OEM equipment and/or skids 40.

The application 92 may run in the background or upon execution by the processor 82 to generate the signature 66 and/or build the interface 72, in accordance with embodiments described herein. The signature 66 may include one or more pieces of information of the identification data, such that the signature 66 may distinguish different skids 40. The application 92 may build the interface 72 using the identification data associated with the signature 66. The interface 72 may be a visualization platform (e.g., visualization interface) that may enable users and/or a computing system (e.g., the cloud platform 68 and the distributed control system 70) to visualize data associated with the skids 40. In some embodiments, the interface 72 may enable users and/or a computing system (e.g., the cloud platform 68 and the distributed control system 70) to provide inputs and/or adjust operations of the skids 40.

In some embodiments, the application 92 may perform "data mapping" that may enable recognitions and arrangements of data from skids 40 associated with different entities, such that the data acquired from different skids 40 may be presented in a common interface. For example, data provided from one skid 40 may include analog voltage values that represent temperature. Based on the respective signature 66, the application 92 may map the analog voltage values provided via the skid 40 (e.g., via the skid computing system 48 or 64) to temperature values according to a corresponding scale between the analog values and the temperature values, as used by the skid computing system 40. The application 92 may then present the temperature values via the interface 72, such that other systems (e.g., cloud platform 68, the distributed control system 70) may view the data in the same manner as presented by the respective skid computing system 48 or 64.

In some embodiments, the application 92 may use inputs from users (e.g., provided via the I/O ports 88 coupled to input devices such as a keyboard, a mouse, the display 90, and so forth) to build the interface 72. In addition, the application 92 may recognize that the coupled skid 40 is a modified version of an existing skid 40 (e.g., corresponding interface saved in the database 62, the memory 84, and/or the storage 86). In this case, the application 92 may retrieve the existing interface and enable users to input modifications to the existing interface to build an interface for the modified version skid 40. As such, at least a portion of the older interface (e.g., interface for the original version skid 40) may be reused for the modified interface (e.g., interface for the modified version skid 40).

The I/O ports 88 may enable data communication between the interface gateway system 60 and other types of equipment, computing devices, or peripheral devices. The I/O ports 88 may enable a user to input information by way of keyboard, mouse, the display 90 (e.g., a touch screen display), etc. The display 90 may include any type of electronic display such as a liquid crystal display, a light-emitting-diode display, and the like. In certain embodiments, the display 90 may be a touch screen display or any other type of display capable of receiving inputs from a user of the interface gateway system 60. In certain embodiments, various stages of the skid integration process (e.g., communication with the skids 40, generation of the signature 66, generation of the interfaces 72, communication with the one or more cloud platforms 68 and/or the one or more distributed control systems 70) may also be presented using the display 90.

Although the interface gateway system 60 is described as having the components depicted in FIG. 4, it should be noted that the interface gateway system 60 may include additional or fewer components as described above. In addition, the skid computing system 48, the skid computing system 64, the cloud platform 68, and the distributed control system 70 may include similar components as described above with respect to FIG. 4.

Figure 5:
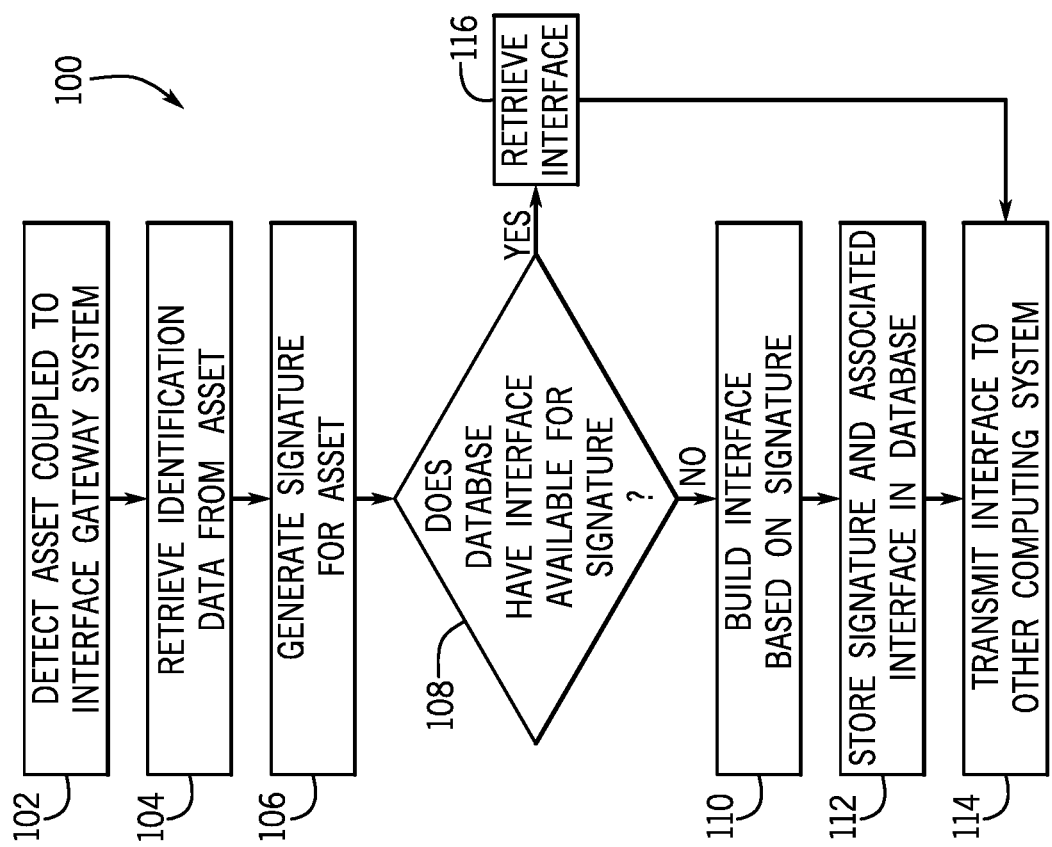
FIG. 5 illustrates a flow chart of a method for using the interface gateway system of FIG. 4 for integrating OEM skids, in accordance with embodiments presented herein.

FIG. 5 illustrates a flow chart of a method 100 of using the interface gateway system 60 of FIG. 3 for integrating assets (e.g., various pieces of OEM equipment or the skid 40) onto a common platform. Although the following description of the method 100 is provided in a particular order, it should be noted that the method 100 may be performed in any suitable order. In addition, although the method 100 is described as being performed by the interface gateway system 60, it should be understood that the method 100 may be performed by any suitable computing system.

At block 102, the interface gateway system 60 may detect an asset (e.g., a piece of OEM equipment or a skid) coupled to the interface gateway system 60. For example, the interface gateway system 60 may detect wired or wireless connection with the asset. At block 104, the interface gateway system 60 may retrieve identification data from the asset. For example, the interface gateway system 60 may communicatively couple to the skid computing system 48 or 64 and retrieve identification data. As set forth above, examples of the identification data may include, but not limited to, an indication of an identity of the OEM equipment, a location (e.g., global positioning system (GPS) coordinate) of the OEM equipment, a vendor or manufacturer associated with the OEM equipment, a model number associated with the OEM equipment, a serial number associated with the OEM equipment, a firmware version associated with the OEM equipment, and a context of functionalities or characteristics of the OEM equipment.

At block 106, the interface gateway system 60 may generate a signature for the asset. In particular, the interface gateway system 60 may generate a signature (e.g., the signature 66) based on the retrieved identification data. For example, the signature 66 may include one or more pieces of information of the identification data, such that the signature 66 may distinguish this asset from other assets. In one embodiment, the interface gateway system 60 may determine one or more elements (e.g., instructions) that are used in the programming of the respective computing system (e.g., skid computing system 48). By way of example, the identification information of the asset may include instructions with regard to how data from the asset is to interface with other systems. For instance, the instructions may indicate one or more data ports, memory locations, or the like where certain data may be stored. In addition, the instructions may indicate the type of data (e.g., binary, discrete, analog, read/write) that may be stored in the respective location. The data provided via the instructions or the identification information may be used to form a composite interface that presents the data available on the asset, different control options for the asset, and the like. In any case, the data provided by the identification data including the elements used for programming the respective computing system may be synthesized into a signature (e.g., the signature 66) that uniquely identifies the respective asset or collection of assets.

In another embodiment, the respective computing system may include information or interface data that defines how data stored in the respective computing system is presented via a respective interface of the respective computing system. Using this information, the interface gateway system 60 may generate a signature 66 that corresponds to the connected asset and the details with regard to how the respective computing system presents data and control operations via its respective interface.

At block 108, after the signature 66 is generated, the interface gateway system 60 may determine whether an interface for the signature 66 generated at block 106 exists in the database 62. For example, the interface gateway system 60 may search the memory 84, the storage 86, and/or the database 62 for an interface associated with the particular signature 66. If no interface available, at block 110, the interface gateway system 60 may build the interface 72 based on the signature 66 and/or inputs provided by users. For example, the interface gateway system 60 may run the application 92 (e.g., an interface builder application) to build the interface 72. The application 92 may build the interface 72 using the identification data associated with the signature 66. As mentioned above, the interface 72 may include a visualization that depicts the data available on the respective computing system, operations that may be performed by the respective computing system, and the like.

The application 92 may also use inputs from users (e.g., provided via the I/O ports 88 coupled to input devices such as a keyboard, a mouse, the display 90, and so forth) to build the interface 72. In some embodiments, as discussed above, the application 92 may recognize that the coupled skid 40 is a modified version of an existing skid 40 (e.g., corresponding interface saved in the database 62, the memory 84, and/or the storage 86). In this case, the application 92 may retrieve the existing interface and enable users to input modifications to the existing interface to build an interface for the modified version skid 40. As such, at least a portion of the older interface (e.g., interface for the older version skid 40) may be reused for the modified interface (e.g., interface for the newer version skid 40).

At block 112, the interface gateway system 60 may store the generated signature 66 and the associated interface 72 in the database (e.g., the memory 84, the storage 86, and/or the database 62). At block 114, the interface gateway system 60 may transmit (e.g., via wired or wireless communication) the interface 72 to other computing systems. For example, the interface gateway system 60 may transmit the built interface 72 to the one or more cloud platforms 68 and/or the one or more distributed control systems 70. After receiving the interface 72, the respective system may present the data provided via the skid computing system 48 or other computing system in a native format or visualization employed by the respective system. That is, the respective system may use the interface 72 to display data to allow the respective system to monitor the respective asset or skid 40 and to adjust operations of the respective asset or skid 40.

Referring back to block 108, if an available interface (e.g., the interface 72) already exists, the interface gateway system 60 may retrieve the interface 72 (e.g., from the memory 84, the storage 86, and/or the database 62) at block 116. Subsequently, the interface gateway system 60 may transmit the retrieved interface 72 to the one or more cloud platforms 68 and/or the one or more distributed control systems 70 at block 114.

Figure 6:
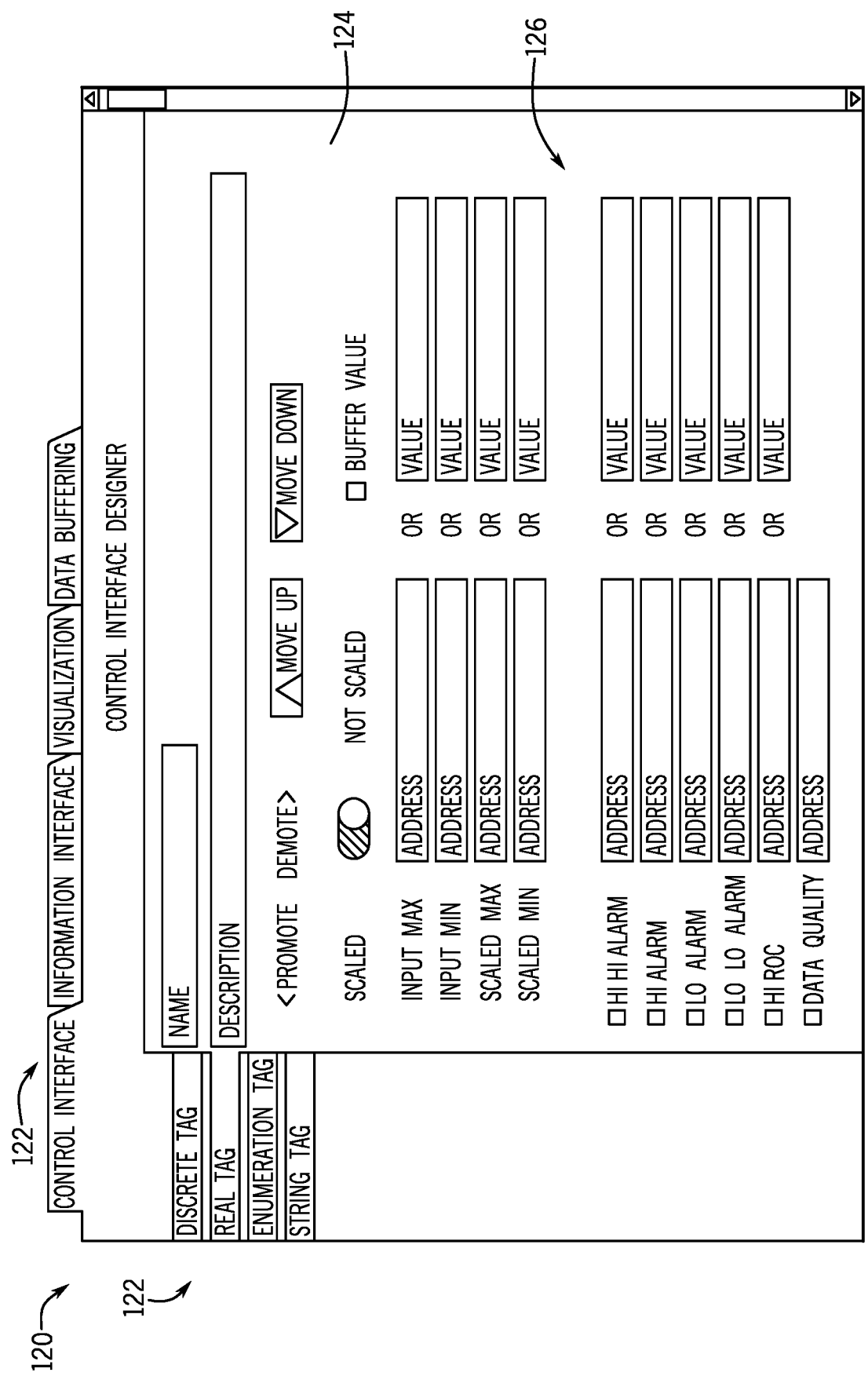
FIGS. 6, 7, and 8 illustrate schematics of example design options presented by the interface gateway system of FIG. 4, in accordance with embodiments presented herein.
Figure 7:
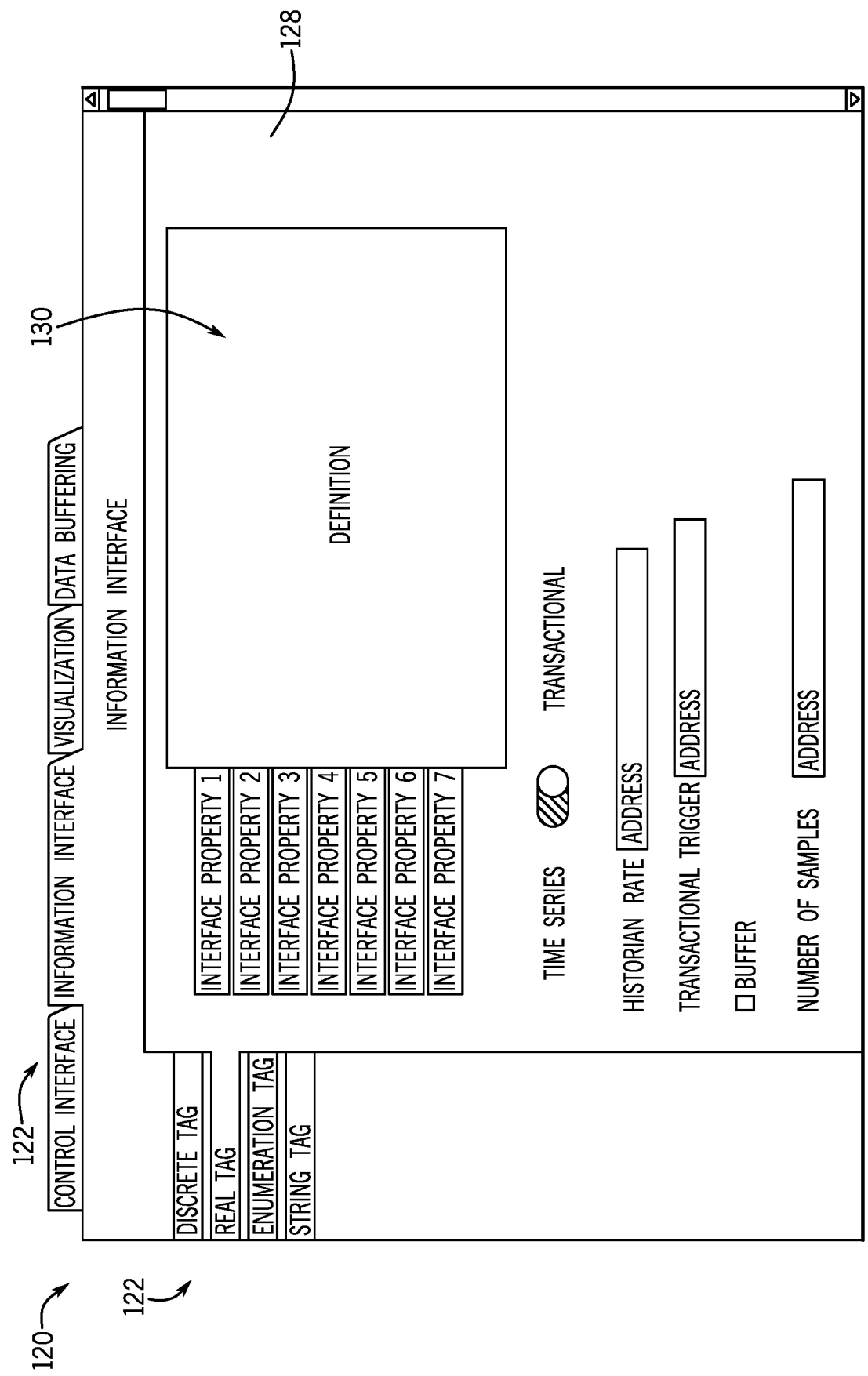
Figure 8:
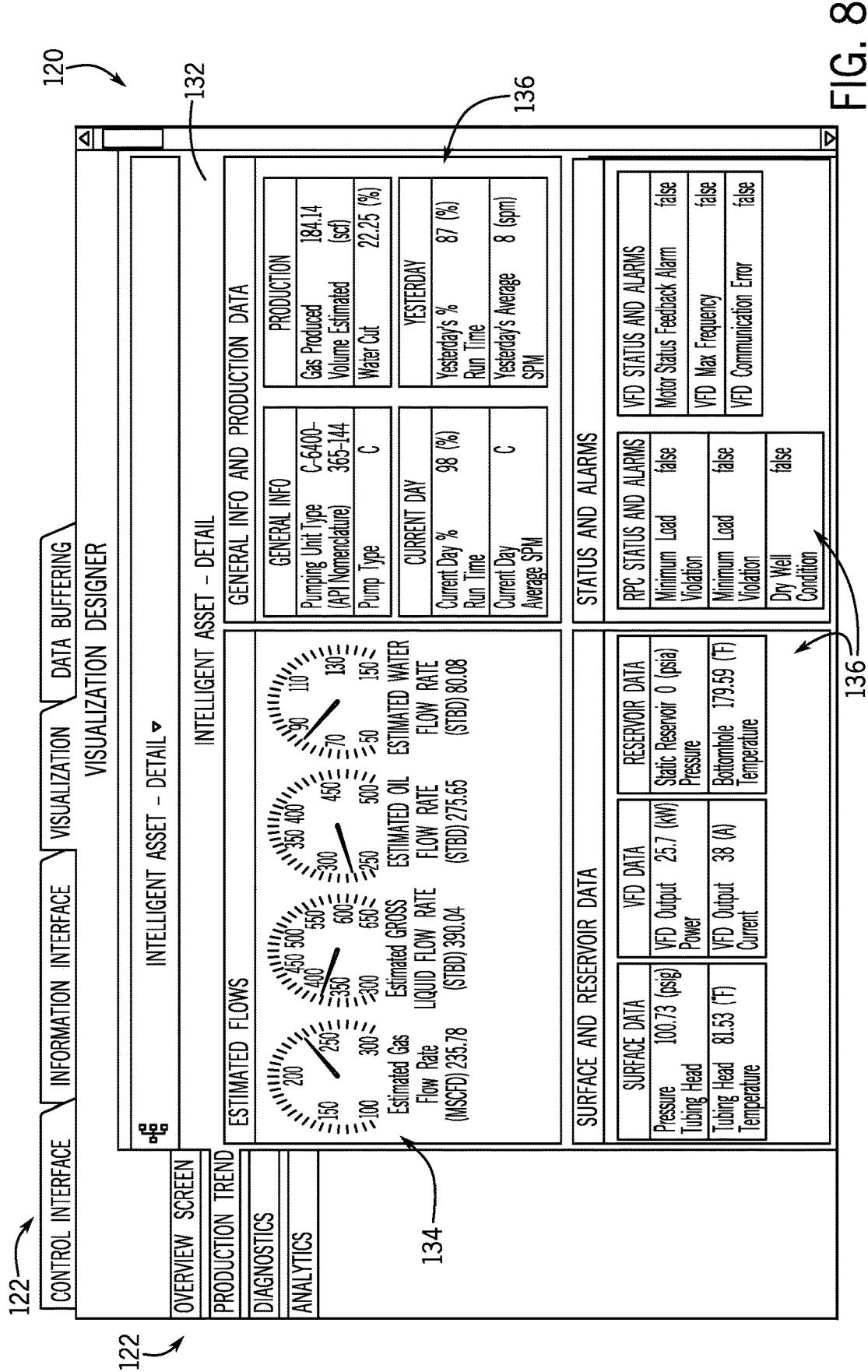

FIGS. 6, 7, and 8 illustrate schematics of certain aspects of an example design options presented by the application 92 of the interface gateway system 60. In the illustrated embodiment of FIG. 6, the application 92 may include an interface builder application 120. The interface builder application 120 may enable users to provide inputs and/or make modifications with respect to the process of building the interface 72. The interface builder application 120 may include multiple tabs 122 corresponding to different functions of the application 120. Each of the tabs 122 may include a window 124 or screen for displaying content and/or enabling user inputs. For example, in FIG. 6, the tab 122 may be associated with the window 124 (e.g., control interface designer window). The interface builder application 120, via the window 124, may enable inputs 126 to be incorporated into the interface 72. The inputs 126 may include information or data of the identification data, such as name of the skid 40, description of the skid 40, a range (e.g., maximum and minimum values) of a respective parameter, alarm information, and the like. The inputs 126 may be entered by users (e.g., via a drop down box, a selection menu, text entering, or the like). The inputs 126 may also be auto-populated by the interface builder application 120 based on the signature of the respective skid 40.

As another example, in FIG. 7, one of the multiple tabs 122 may be associated with a window 128 (e.g., information interface window). The interface builder application 120, via the window 128, may display and/or enable users to input information associated with the interface 72. For example, the information associated with the interface 72 may include various interface properties 130 (e.g., interface property 1, interface property 2, interface property 3, and so forth) defined by the user associated with the interface 72. The interface properties 130 may be displayed in text.

As another example, in FIG. 8, one of the multiple tabs 122 may be associated with a window 132 (e.g., visualization designer window). The interface builder application 120, via the window 132, may display "mapped" identification data associated with the interface 72. As set forth above, "data mapping" may enable recognitions and arrangements of data from the skids 40 associated with different entities, such that the data acquired from different skids 40 may be presented in a common format using the interface 72. In the illustrated embodiments, the window 132 may represent the data acquired from the skid computing system 48, for example, and presented in a format associated with another computing system. That is, each respective data field presented in the window 132 may be populated with data that corresponds to the respective data field, such that the data is acquired via the skid computing system 48 and mapped to the appropriate data field based on the interface 72. In some embodiments, the mapped data may be displayed via graphic presentations 134, such as charts, plots, diagrams, and so forth. For example, the graphic presentations 134 may include gauges for indicating various parameters (e.g., flow rates, temperatures, pressures, concentrations, and so forth) obtained from the skids 40, presented within a gauge range (e.g., between a minimum value and a maximum value). In some embodiments, the mapped data may be displayed via texts or tables 136. In the illustrated window 132, the mapped data include general information of the skid 40 (e.g., pumping unit type, motor type, controller type, fluid level), production of the skid 40 (e.g., gas produced volume, oil produced volume, water produced volume), production history of the skid 40 (e.g., average, minimum, and maximum production for the present day, for yesterday, for previous weeks). In the illustrated window 132, the mapped data may also include alarm information (e.g., true or false corresponding to certain alarm criteria) of the skid 40.

In some embodiments, the interface 72 may include data or information used in the interface builder application 120 and may include features of the interface builder application 120, as set forth above. For example, the interface 72 may be a visualization interface or platform including tabs or pages (e.g., tabs 122) capable of displaying identification data via texts, tables, and/or graphics, such that users and/or a computing system (e.g., the cloud platform 68 and the distributed control system 70) may visualize data associated with the skids 40. Furthermore, the interface 72 (e.g., visualization interface) may include edit function, selection function, and so forth to enable users and/or a computing system (e.g., the cloud platform 68 and the distributed control system 70) to adjust operations of the skids 40 and/or edit data associated with the skids 40.

While only certain features of the present embodiments disclosed herein have been illustrated and described herein, many modifications and changes will occur to those skilled in the art. It is, therefore, to be understood that the appended claims are intended to cover all such modifications and changes as fall within the true spirit of the present embodiments.

The invention claimed is:

1. A system, comprising:
   a database;
   a computing system configured to control one or more operations of industrial equipment disposed on a skid;
   a skid computing system directly coupled to the industrial equipment and configured to control the one or more operations of the industrial equipment; and
   an interface gateway system configured to communicate with the computing system and the skid computing system, wherein the interface gateway system is configured to:
      retrieve identification data associated with the industrial equipment from the skid computing system;
      generate a signature associated with the industrial equipment based on the identification data;
      generate an interface configured to interpret data related to the industrial equipment based on the signature;
      store the interface and the signature in the database; and
      transmit the data related to the industrial equipment and the interface to the computing system, wherein the interface is configured to enable the computing system to:
         display the data related to the industrial equipment via a display of the computing system; and
         adjust the one or more operations of the industrial equipment via the skid computing system.

2. The system of claim 1, wherein the data related to the industrial equipment is displayed on the computing system using a format associated with the computing system.

3. The system of claim 2, wherein the format comprises a graphical presentation, textural presentation, or both.

4. The system of claim 1, wherein the skid computing system is manufactured by a different entity as compared to the computing system.

5. The system of claim 1, wherein the skid comprises a filtration skid, a chiller skid, a mining skid, a steam system, a package boiler skid, an oil and gas skid, a water skid, a waste water skid, or a bio reactor skid.

6. The system of claim 1, wherein the identification data comprises an indication of an identity of the industrial equipment, a location coordinate of the industrial equipment, a manufacturer of the industrial equipment, a model number of the industrial equipment, a serial number of the industrial equipment, a firmware version used by the industrial equipment, a context of one or more functionalities of the industrial equipment, or any combination thereof.

7. The system of claim 1, wherein the signature is configured to distinguish the industrial equipment from a different industrial equipment.

8. The system of claim 1, wherein the interface gateway system is configured to generate the interface based on one or more user inputs related to the industrial equipment.

9. The system of claim 1, wherein the interface gateway system is configured to generate the interface by retrieving an existing interface from the database based on the signature.

10. A method, comprising:
    retrieving, via a processor, identification data associated with industrial equipment from a first computing system directly coupled to the industrial equipment;
    generating, via the processor, a signature associated with the industrial equipment based on the identification data;
    retrieving, via the processor, an interface configured to interpret data related to the industrial equipment from a database based on the signature, wherein the database comprises a plurality of interfaces;
    transmitting, via the processor, the data related to the industrial equipment and the interface to a second computing system, wherein the interface is configured to enable the second computing system to:
       generate one or more visualizations comprising the data related to the industrial equipment; and adjust one or more operations of the industrial equipment via the first computing system.

11. The method of claim 10, wherein the one or more visualizations are displayed on the second computing system using a format associated with the second computing system.

12. The method of claim 11, wherein the format comprises a graphical presentation, textural presentation, or both.

13. The method of claim 10, wherein the first computing system is manufactured by a different entity as compared to the second computing system.

14. The method of claim 10, wherein retrieving, via the processor, the identification data comprises retrieving an indication of an identity of the industrial equipment, a location coordinate of the industrial equipment, a manufacturer of the industrial equipment, a model number of the industrial equipment, a serial number of the industrial equipment, a firmware version used by the industrial equipment, a context of one or more functionalities of the industrial equipment, or any combination thereof.

15. The method of claim 10, wherein generating, via the processor, the signature comprises generating the signature that is configured to distinguish the industrial equipment from a different industrial equipment.

16. A non-transitory computer readable medium comprising computer-executable code when executed is configured to cause a processor to:
retrieve identification data associated with industrial equipment from a first computing system directly coupled to the industrial equipment;
generate a signature associated with the industrial equipment based on the identification data;
generate an interface configured to interpret data related to the industrial equipment based on the signature;
store the interface and an association with a respective signature in a database; and
transmit the data related to the industrial equipment and the interface to a second computing system, wherein the interface is configured to enable the second computing system to:
display the data related to the industrial equipment via a display of the second computing system; and
adjust one or more operations of the industrial equipment via the first computing system.

17. The non-transitory computer readable medium of claim 16, wherein the data related to the industrial equipment is displayed on the second computing system using a format associated with the second computing system.

18. The non-transitory computer readable medium of claim 17, wherein the format comprises a graphical presentation, textural presentation, or both.

19. The non-transitory computer readable medium of claim 16, wherein the first computing system is manufactured by a different entity as compared to the second computing system.

20. The non-transitory computer readable medium of claim 16, wherein the identification data comprises an indication of an identity of the industrial equipment, a location coordinate of the industrial equipment, a manufacturer of the industrial equipment, a model number of the industrial equipment, a serial number of the industrial equipment, a firmware version used by the industrial equipment, a context of one or more functionalities of the industrial equipment, or any combination thereof.

* * * * *